US010032114B2

(12) United States Patent
Baldini Soares et al.

(10) Patent No.: US 10,032,114 B2
(45) Date of Patent: Jul. 24, 2018

(54) PREDICTING APPLICATION PERFORMANCE ON HARDWARE ACCELERATORS

(71) Applicant: International Business Machines Corporation, Armonk, NY (US)

(72) Inventors: Ioana M. Baldini Soares, Irvington, NY (US); Stephen J. Fink, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/485,303

(22) Filed: Apr. 12, 2017

(65) Prior Publication Data

US 2017/0220942 A1  Aug. 3, 2017

Related U.S. Application Data

(62) Division of application No. 14/267,547, filed on May 1, 2014, now Pat. No. 9,715,663.

(51) Int. Cl.
  *G06N 5/04* (2006.01)
  *G06N 99/00* (2010.01)

(52) U.S. Cl.
  CPC ............. *G06N 5/04* (2013.01); *G06N 99/005* (2013.01)

(58) Field of Classification Search
  None
  See application file for complete search history.

(56) References Cited

U.S. PATENT DOCUMENTS

| 8,839,210 | B2 | 9/2014 | Kamigata |
| 9,104,505 | B2 | 8/2015 | Dube et al. |
| 2006/0074970 | A1 | 4/2006 | Narayanan et al. |
| 2008/0133211 | A1 | 6/2008 | Dombrowski et al. |
| 2011/0320391 | A1 | 12/2011 | Chen et al. |
| 2014/0089509 | A1 | 3/2014 | Akolkar et al. |
| 2014/0173608 | A1 | 6/2014 | Jeong |
| 2014/0188446 | A1 | 7/2014 | Kimura |
| 2014/0215471 | A1 | 7/2014 | Cherkasova et al. |
| 2015/0100971 | A1 | 4/2015 | Dube et al. |
| 2015/0161386 | A1 | 6/2015 | Gupta et al. |

OTHER PUBLICATIONS

List of IBM Patents or Patent Applications Treated as Related, dated Apr. 12, 2017, 2 pages.
Meswani, M.R., et al., "Modeling and Predicting Application Performance on Hardware Accelerators", Workload Characterization (IISWC), 2011 IEEE International Symposium, Austin, TX, Nov. 6-8, 2011, p. 73.

(Continued)

*Primary Examiner* — Alan Chen
(74) *Attorney, Agent, or Firm* — Scully, Scott, Murphy & Presser, P.C.; Yeen C. Tham, Esq.

(57) ABSTRACT

Predicting program performance on hardware devices, in one aspect, may comprise obtaining a set of existing applications and observed performance on a target hardware device. The set of existing applications are run on one or more general purpose computer processors and application features are extracted from the existing application. A machine learning technique is employed to train a predictive model based on the extracted application features and the observed performance for predicting application performance on the target hardware device.

7 Claims, 7 Drawing Sheets

(56) References Cited

OTHER PUBLICATIONS

Ozisikyilmaz, B., et al., "Machine Learning Models to Predict Performance of Computer System Design Alternatives", 37th International Conference on Parallel Processing, 2008, Downloaded on Feb. 3, 2010 from IEEE Xplore, pp. 495-502.

Matsunaga, A., et al., "On the use of machine learning to predict the time and resources consumed by applications", 10th IEEE/ACM International Conference on Cluster, Cloud and Grid Computing, May 17-20, 2010, pp. 495-504.

Weeratunga, S., "173.applu", SPEC CPU2000 Benchmark Description File, Standard Performance Evaluation Corporation, https://spec.org/cpu2000/CFP2000/173.applu/docs/173.applu.html, Last updated Dec. 14, 1999, 3 pages.

O'Hallaron, D.R., et al., "183.equake", SPEC CPU2000 Benchmark Description File, Standard Performance Evaluation Corporation, https://www.spec.org/cpu2000/CFP2000/183.equake/docs/183.equake.html, Last updated Oct. 13, 1999, 2 pages.

Stallman, R., "176.gcc", SPEC CPU2000 Benchmark Description File, Standard Performance Evaluation Corporation, https://www.spec.org/cpu2000/CINT2000/176.gcc/docs/176.gcc.html, Last updated Apr. 25, 2000, 3 pages.

Loebel, A., "181.mcf", SPEC CPU2000 Benchmark Description File, Standard Performance Evaluation Corporation, https://www.spec.org/cpu2000/CINT2000/181.mcf/docs/181.mcf.html, Last updated Oct. 14, 1999, 4 pages.

Paul, B.E., "177.mesa", SPEC CPU2000 Benchmark Description File, Standard Performance Evaluation Corporation, https://www.spec.org/cpu2000/CFP2000/177.mesa/docs/177.mesa.html, Last updated Nov. 10, 1999, 2 pages.

PREDICTING APPLICATION PERFORMANCE ON HARDWARE ACCELERATORS

FIELD

The present application relates generally to computers, and computer applications, heterogeneous computing systems, machine learning, and more particularly to predicting application performance on hardware processors.

BACKGROUND

Hardware accelerators are becoming widely available with system vendors offering various hybrid architectures. Hardware accelerators are difficult to program and require extensive modifications of the application by specialized users with domain-specific knowledge. In this context, one fundamental issue is determining which applications could take advantage of which type of hardware acceleration. Performance varies across applications and devices, and new languages may be needed to program on the special devices. While hardware acceleration can boost application performance, the process of identifying candidates for acceleration and actually porting the application onto the new hardware are both difficult tasks that require considerable effort and domain-specific knowledge.

Other approaches for predicting application performance on hardware accelerators depend on analytical models for the accelerator performance and/or (manual) discovery of idioms in applications that can benefit from accelerators. Domain-specific expertise and a close examination of the accelerator architecture are needed to build analytical models. In addition, every hardware accelerator needs its own model; usually, it is difficult if not impossible to generalize a model to a class of accelerators. In general, each accelerator needs careful analysis to derive a corresponding analytical model. Identifying idioms in applications that could benefit from accelerators require user input to either express the application using predefined patterns or manually defining patterns to be recognized in the existing application code.

BRIEF SUMMARY

A method of predicting program performance on hardware devices, in one aspect, may comprise obtaining a set of existing applications and observed performance (e.g., performance metric or speedup) on a target hardware device, The method may also comprise running the set of existing applications on one or more general purpose computer processors and extracting application features from the existing application. The method may further comprise inputting the application features and the observed performance on a target hardware device to a machine learning technique. The method may also comprise executing the machine learning technique. The method may further comprise training a predictive model by the machine learning technique for predicting application performance on the target hardware device.

In another aspect, a method of predicting a hardware device for best program performance may be provided. The method may comprise obtaining a plurality of existing applications and observed performance on a plurality of target hardware devices. Each of the plurality of existing applications may be labeled with one of the plurality of target hardware devices. The method may also comprise running the plurality of existing applications on one or more general purpose computer processors and extracting application features from the existing application. The method may further comprise inputting the application features, labels associated with the existing applications, and the observed performance on the plurality of target hardware device to a machine learning technique. The method may also comprise executing the machine learning technique. The method may further comprise training a predictive model by the machine learning technique for predicting a target hardware device out of the plurality of target hardware devices for running a given application.

A system for predicting program performance on hardware devices, in one aspect, may comprise a set of existing applications and observed performance on a target hardware device. One or more general purpose computer processors are operable to execute the set of existing applications and extract application features from the existing application. A machine learning algorithm may be operable to run on the one or more general purpose computer processors and further operable to train a predictive model for predicting application performance on the target hardware device, based on the application features and the observed performance on the target hardware device.

In another aspect, a system for predicting a hardware device for best program performance may be provided. The system may comprise a plurality of existing applications and observed performance on a plurality of target hardware devices. Each of the plurality of existing applications may be labeled with one of the plurality of target hardware devices. One or more general purpose computer processors are operable to run the plurality of existing applications and extract application features from the existing application. A machine learning algorithm may be run with the application features, labels associated with the existing applications, and the observed performance on the plurality of target hardware device. The machine learning algorithm trains a predictive model for predicting a target hardware device out of the plurality of target hardware devices for running a given application.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
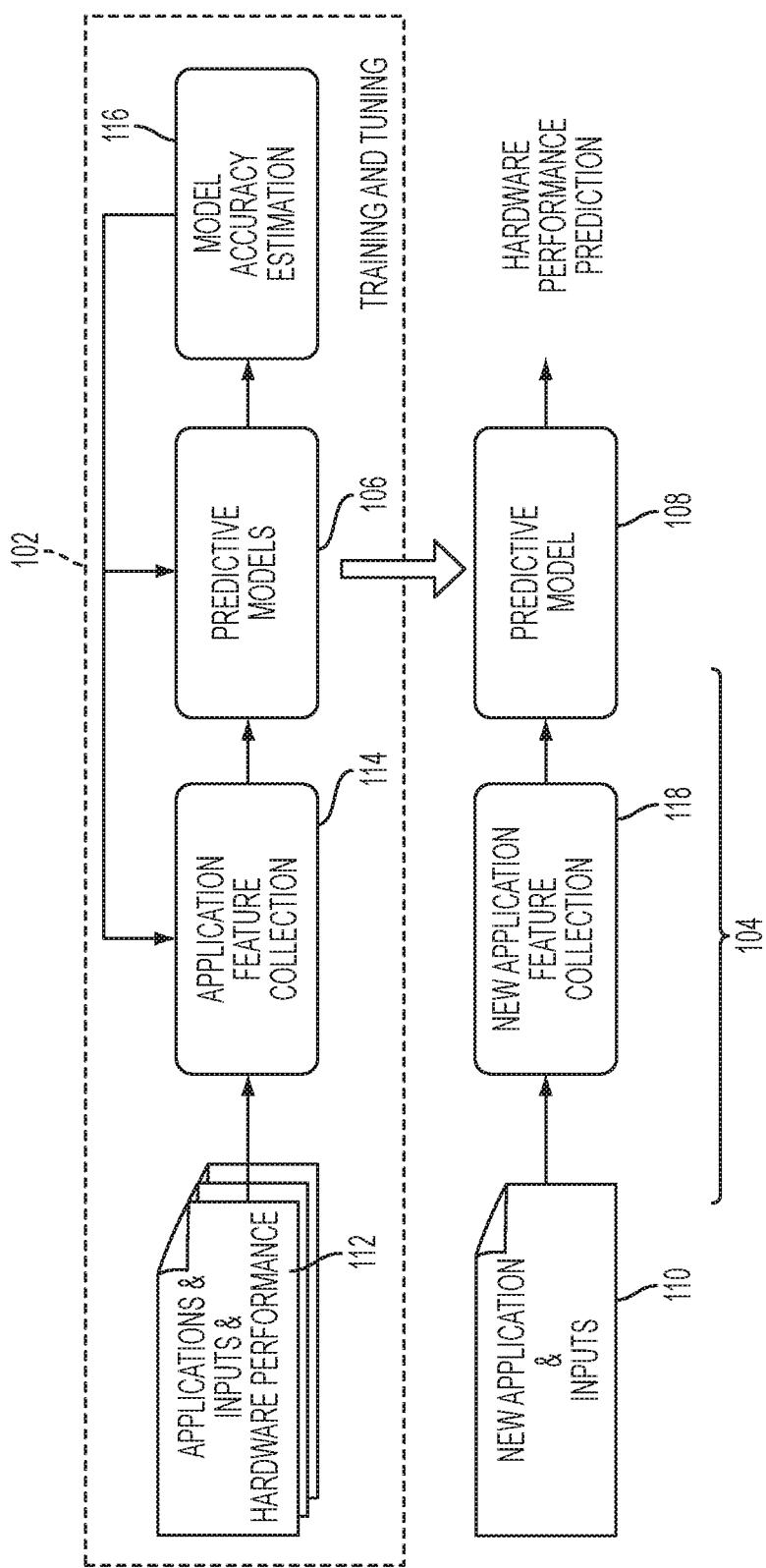
FIG. 1 is a high-level diagram that illustrates building a predictive model and applying the model to an application for predicting, in one embodiment of the present disclosure.

In one embodiment of the present disclosure, a mechanism or methodology is provided to predict the increase in application performance if portions of the applications were to be ported to hardware processors such as hardware accelerators. Such a mechanism predicts improvement in application performance given a processor or an accelerator before investing the time and effort in porting the application code for the new hardware processor such as a hardware accelerator.

The mechanism in one embodiment may use a machine learning technique or another statistical predictive technique to build one or more predictive models by inspecting the behavior of the original application code when run on general purpose processors. Such a performance predictor allows for selecting which applications are amenable for acceleration and are worth investing the effort of porting onto new platforms.

The mechanism may be implemented or developed as a computer-implemented tool that extracts features from original application code and builds a predictive model for the performance of the accelerated applications. For a new application, such tool may collect several features by running the application on a general purpose processor. These features are fed into the model which predicts the magnitude of the speedup if the application were to be run on a new hardware processor such as with hardware acceleration.

In one embodiment, the tool uses original and accelerated code for a set of applications based on which the predictive model is built. Once the model is built, it can predict potential performance of accelerated code from original, non-accelerated code of a new application. The application features collected and employed in the model may include characteristics of the application such as percentage of computation instruction, percentage of branches and reads. Such features can be collected through binary instrumentation, or, if a lower overhead is desired, through hardware counters available in current processors. In one embodiment of the present disclosure, the model may be based on traditional machine learning techniques such as support vector machines and nearest-neighbor classification. The tool may also include predictive models that given accelerated code can predict which device would provide the best performance from a set of compatible accelerators. Such a feature can be instrumental in scheduling applications in a heterogeneous system.

The mechanism of the present disclosure provides for the ability to extrapolate from the performance experienced by some applications on the new hardware accelerator in order to predict the potential performance improvement for new applications before porting to the new hardware. Such a tool can help decide which applications can benefit from acceleration. In addition, it can help identify which hardware accelerators are more effective in speeding up a set of existing applications, helping to decide which equipment to purchase.

In one aspect, the mechanism of the present disclosure need not require manual intervention. The model can be automatically tuned for a new hardware accelerator without carefully analyzing the architecture of the accelerator or the application code. In one aspect, no architecture details of the accelerator may be needed in the model.

An example hardware accelerator is a graphical processing unit (GPU). The utility of such a tool against more than a dozen benchmarks in the context of GPU acceleration verified the tool's accuracy in identifying potential application speedup. The robustness of the model was also verified by applying it to two different GPU accelerators. It should be noted that, while the description herein uses GPU as an example accelerator in explaining the mechanism of the present disclosure, the mechanism is not limited only to GPUs. Rather, the mechanism is applicable to any other hardware processors and/or accelerators.

As an example, graphics processing units (GPUs) can deliver considerable performance gains over general purpose processors. However, GPU performance gains vary considerably across applications. Porting applications to GPUs can require significant effort, rewriting code with GPU-specific languages. In light of the significant porting costs, it would be desirable to predict which applications would benefit most before porting to the GPU.

In the present disclosure, machine learning techniques build accurate predictive models for such hardware processor acceleration, e.g., GPU acceleration. In one aspect, an approach is presented which applies supervised learning algorithms to infer predictive models, based on dynamic profile data collected via instrumented runs on general purpose processors.

More generally, a mechanism of the present disclosure may provide for fully automatic construction of predictive models of the target architecture. The mechanism may provide an estimate of the expected speedup, learning from a corpus of past exercises in porting other applications to the hardware in question.

Techniques are presented to apply machine learning to predict hardware (e.g., GPU) performance based on general processor (e.g., central processing unit (CPU)) profile data. For example, predictive models are built using features extracted using dynamic instrumentation running on a general purpose multi-core processor. The results show that a small set of features, derived from dynamic instruction profiles, suffices to train accurate models. These models predict processor (e.g., GPU) speedup, e.g., cast as a binary classification question.

In one aspect, the present disclosure presents how machine learning classifiers can be used to accurately predict processor (e.g., GPU) speedup from applications (e.g., OpenMP applications). OpenMP is an application programming interface (API) that supports multi-processing programming. The models do not require static code analysis or analytical models for the target device. Model tuning for a new device can be performed automatically, given data gathered from exercises porting to the targeted device. The present disclosure also shows that the prediction uses small feature vectors based on dynamic instruction profiles collected on a general purpose multi-core processor. Features may be identified based on, e.g., computation instructions, loads, and branches as most significant. The present disclose also demonstrate that similar models can predict the best device for a system with more than one hardware processor or accelerator (e.g., GPU). Such models can guide scheduling in heterogeneous environments.

The following description illustrates an approach to build predictive models for hardware processor or accelerator (e.g., GPU) performance based on profile data from runs on general purpose multi-core processors. FIG. 1 shows the high-level flow of the approach in one embodiment of the present disclosure. A training phase 102 calibrates a model (shown e.g., at 106 and 108), and a prediction phase 104 applies the model to predict performance for a new application (e.g., shown at 110). The training phase 104 uses a set of existing applications and inputs along with their observed hardware processor (e.g., GPU) speedups 112 on a target device. In one embodiment of the present disclosure, training employs a version of each code suitable for execution on a traditional CPU, which the mechanism of the present disclosure can instrument to gather dynamic profile information. The training phase 102 runs each application and input 112 on a general purpose CPU system, gathering profile data representing a set of application features 114. Next, the mechanism of the present disclosure feeds the application feature profile data 114 and observed hardware (e.g., GPU) speedups 112 into a machine learning toolkit, training a model 106 which predicts GPU speedup based on these features. In one embodiment, the mechanism of the present disclosure refines the models via an iterative tuning process (e.g., shown at 116 iterating back to 114 and 106), which aims to select a model with a small set of input features, while still achieving an acceptable level of accuracy.

In one embodiment, the tuning process (116, 114, 106) explores models with more or fewer features, and also considers different machine learning algorithms to build the model. The training and tuning process 102 produces a predictive model 108 that can be used to forecast hardware (e.g., GPU) performance outcomes for new applications. In one embodiment of the present disclosure, all aspects of the training and tuning process 102 run fully automatically without user intervention.

Having produced a predictive model (e.g., 108), the mechanism of the present disclosure can also forecast hardware (e.g., GPU) speedup given a CPU-only implementation of a new application along with representative inputs (110). The mechanism of the present disclosure in one embodiment runs the new application 110 to collect profile data, extracts model features from the profile data 118, and predicts the hardware (e.g., GPU) performance via the computed model 108. In one embodiment, each step in the prediction process 104 runs fully automatically without user intervention.

Application Features

As described above, the mechanism of the present disclosure in one embodiment employs supervised machine learning to build one or more predictive models, based on a set of features which encapsulate relevant characteristics of an application. The features may be collected via static analysis, dynamic analysis or both. For instance, static code features may be obtained or identified using static analysis. Information such as critical code paths and execution counts may be obtained or identified using dynamic analysis. For example, the application may be instrumented to gather dynamic instruction counts, and group instructions into categories of computation as listed in Table 1.

Table 1 shows example application features used in building the predictive models.

TABLE 1

| Category | Feature | Mnemonic |
|---|---|---|
| Computation | Arithmetic and logic instructions | ALU |
|  | SIMD-based instructions | SIMD |
| Memory | Memory loads | LD |
|  | Memory stores | ST |
|  | Memory fences | FENCE |
| Control flow | Conditional and unconditional branches | BR |
| OpenMP | Speedup of 12 threads over sequential execution | OMP |
| OpenCL | Data transferred to the hardware (e.g., GPU (in KB)) | READ-IN |
|  | Data transferred from the hardware (e.g., GPU (in KB)) | WRITE-OUT |
| Aggregate | Total number of instructions | TOTAL |
|  | Ratio of computation over memory | ALU-MEM |
|  | Ratio of computation over hardware (e.g., GPU) communication | ALU-COMM |

In one embodiment, those features expected to dominate the performance of the hardware in question may be extracted and employed. For instance, the performance of GPU code may be dominated by the computation, memory and control flow present in each application. Further, to avoid scale issues, all instruction-based features may be normalized to the total number of instructions, e.g., divide the number of instruction-based features by the total number of instructions. So, e.g., the total number of instructions may be included among the features used in the models. In addition to instruction counts, OpenMP and OpenCL specific features may be considered. Briefly, OpenCL is a reusable software platform that supports writing programs that execute across heterogeneous computer systems, e.g., comprising devices such as CPUs, GPUs, digital signal processors (DSPs), field programmable gate arrays (FPGAs) and other processors. As an example, for OpenMP runs, 12-thread speedup over sequential execution (i.e., only one thread) when executed on a 12-core system may be included in the feature set.

Communication costs between the host and device often dominate performance when accelerating a kernel. When training from a sequential or OpenMP program, it can be difficult to automatically infer the communication patterns that would emerge after restructuring and optimizing the program for a GPU offload model. So, in one aspect, it is assumed that a trained model adequately accounts for host-device communication costs, learning indirectly from other features derived from the instruction mix. In another aspect, user annotations and/or static code analysis may be employed to infer communication costs from OpenMP or sequential loops. Further, training based on OpenCL programs running on a general-purpose CPU may be also considered. In this scenario, the structure of the OpenCL program directly reflects the anticipated host-device communication pattern. In this scenario, communication volumes may be included as features for training, e.g., as indicated by the OpenCL features in Table 1.

For example, by instrumenting the OpenCL API calls for explicit data transfer, the communication volume between host and device may be measured. Features may be included that measure data transfer to/from a GPU card (READ-IN/READOUT) and aggregates using this information, such as the amount of computation versus communication (ALU-COMM).

Classifier may benefit from including information about the data transferred to and from the GPU card. Having direct data representing explicit communication costs improves predictor accuracy. Hardware (e.g., GPU) speedup may be computed relative to the run time of the parallel OpenCL program on a multi-core processor as baseline. Application features may be collected from OpenCL runs on the general purpose multi-core. The OpenCL multi-core code may generate better predictive data since the code structure on the CPU more closely matches the GPU code.

The mechanism of the present disclosure may also build predictive models based on aggregate features designed to capture relevant performance characteristics. For example, the ratio of memory communication versus computation and the ratio of memory loads compared to compute instructions may be considered. These aggregate features may improve the accuracy of the models. In one aspect, branch divergence issues may greatly impact performance on today's GPUs. An estimate of branch divergence may be computed based on dynamic instrumentation. Since the instrumented code runs on a general purpose processor, the branch instructions in separate threads do not execute in lock-step as they would on a GPU. Instead, to estimate branch divergence effects, the outcomes of branches may be analyzed with same address executed closely in time and by separate threads. These may increase the feature collection time.

In one embodiment, all features may be collected via binary instrumentation of user code, e.g., using Pin, a program analysis tool that offers dynamic instrumentation. Taking GPU as example hardware target, the instrumentation may focus on parallel loops in the case of OpenMP code and kernels for OpenCL code.

The mechanism of the present disclosure may be used with any CPU implementation, including sequential code or thread-based parallel versions, for example, features extracted from such codes.

In one embodiment of the present disclosure, binary instrumentation may be performed in off-line settings, e.g., decoupled temporally from the actual prediction, e.g., before the prediction run, for example, to offset an overhead that might occur over original application code. Once the model is trained for a certain hardware (e.g., GPU), evaluating an additional application may incur only the cost of a Pin run for the new application.

In a case in which the predictive models may be used in runtime contexts (e.g., scheduling in a heterogeneous system), hardware performance counters may be used to collect similar profiles with low overhead.

Classifiers for GPU Performance

In considering porting program code to a hardware device (e.g., GPU), a question asks whether the speedup at the hardware device justifies the porting effort. To answer this question, it would be useful to know whether a code would likely exhibit a speedup beyond a threshold T if ported to a hardware (e.g., GPU) device. In one embodiment of the present disclosure, such a question can be formulated as a binary classification problem, where the class identifier denotes whether or not the application running with a particular input exhibits a hardware (e.g., GPU) speedup greater than a threshold T. Binary classification may be approached via supervised learning, a type of machine learning. Supervised learning operates on labeled data, where each x in the data set has an associated label y. Based on a training set of labeled data, a supervised learning algorithm infers a function to predict the labels y for unseen examples x.

In classification problems, the data in the training set is split in categories or classes. Each element in the data set carries a set of labels which correspond to class identifiers. Classification algorithms infer functions that predict the class identifier for a new, unseen element. Binary classification refers to problems in which the data belongs to only two classes. The mechanism in one embodiment of the present disclosure may build such classifiers using the dynamic application features, e.g., described above. Examples of classifier algorithms used in building a predictive model may include nearest neighbor with generalized exemplars (NNGE), and support vector machines.

Nearest-neighbor and SVM algorithms are known algorithms described below briefly and generally for reference.

Nearest Neighbor with Generalized Exemplars

K-nearest neighbor is one of classification algorithms. This algorithm decides the class of an unseen exemplar by computing distances between the new exemplar and the labeled data in the training set and selecting the dominant class among the k closest neighbors. When k=1, the algorithm chooses the class of the nearest neighbor.

Nearest neighbor with generalized exemplars (NNGE) improves upon the classical nearest neighbor learning algorithm by applying generalization for the elements in the data set. NNGE generalizes the closest two exemplars belonging to the same class into the hyper-rectangle determined by the two exemplars. NNGE computes distances between an unseen exemplar and the hyper-rectangles in the dataset, as opposed to individual data points. The algorithm tries to generalize new examples to the closest neighbor of the same class, unless it finds a conflict with other examples or hyper-rectangles in the model. If an existing hyper-rectangle conflicts with a new example, the hyper-rectangle is split into multiple hyper-rectangles.

The algorithm uses a weight formula when computing distances. The formula rewards features that contribute to the accurate predictions. As a consequence, NNGE produces a list of features, ordered by their weights. The mechanism of the present disclosure in one embodiment may use this ordered list to experiment with feature subsets. The mechanism of the present disclosure in one embodiment may tune NNGE using different number of tries for generalization.

Classification with Support Vector Machines

Support vector machine (SVM) is a technique used in machine learning for classification and regression analysis. Used as a binary classifier for a set of data points, SVM tries to find a hyperplane that separates the data in such a way that the distances from the nearest points to the hyperplane is maximized; such a hyperplane is usually referred to as the maximum-margin hyperplane.

SVM are used in conjunction with kernel methods. Kernel methods map the initial data set to a higher dimensional space using kernel functions with special properties that make the computation in the higher-dimensional space tractable. The maximum-margin hyperplane identified by SVM in the higher-dimensional space corresponds to a non-linear surface in the initial space. Thus, kernel SVM find non-linear separation surfaces for data points that are not linearly separable.

Several kernel functions can be used with SVM. The mechanism of the present disclosure in on embodiment may use the radial basis function (or Gaussian kernel). The resulting model depends on two main parameters: a factor C used in regularization and a parameter gamma used by the kernel function.

Figure 2:
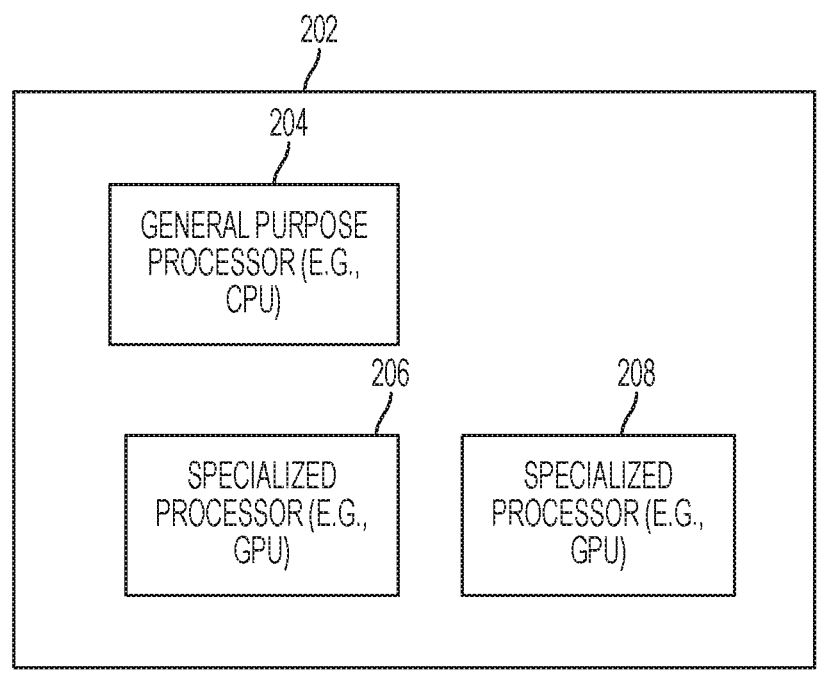
FIG. 2 illustrates an example hardware infrastructure used to implement a methodology of the present disclosure in one embodiment.

FIG. 2 illustrates an example hardware infrastructure used to implement a methodology of the present disclosure in one embodiment. A server machine 202 may include a processor 204, e.g., a dual-processor Intel® Xeon® CPU X5690, with each processor having multiple cores, e.g., six cores running at 3.47 GHz, for a total of 12 cores. The server 202 may be equipped with one or more hardware devices (e.g., 206, 208), for example, two high-end graphics cards: an ATI FirePro™ v9800 and a Nvidia Tesla™ C2050. Other hardware configurations may be considered. Other components of a server machine are not shown in the figure.

Applications may be run on such hardware infrastructure. The data set used to derive the predictive models is extracted from the runs. As an example, the application runs may include OpenMP and OpenCL implementations. The results measure hardware (e.g., GPU) speedups using the OpenCL implementations. The CPU performance and feature collection may be performed using the OpenMP program on the Intel multi-core platform shown in FIG. 2 or another hardware configuration. Results may be also obtained on CPU performance and feature collection using the OpenCL implementation running on the Intel multicore platform. As a specific example, speedups may be computed against baseline runs that take full advantage of the 12 cores available in the server (e.g., as opposed to sequential execution on a single thread). A baseline run refers to an application run or execution on a general purpose processor such as the CPU. A baseline run can be obtained using the available general processor configuration. In the hardware configuration shown in FIG. 2, the 12-core performance provides a useful reference point (baseline run) when evaluating hardware (e.g., GPU) speedup. Speedups may be computed with respect to end-to-end application wall clock time, including the time to transfer the data to/from the GPU.

Cross-Validation

Cross-validation is a known standard technique to estimate how well a statistical model built using a limited data set will generalize to an independent data set. Cross-validation may be used to evaluate the accuracy of predictive models, which indicates how well models are expected to perform in practice. Cross-validation involves several computation rounds. One round of cross-validation splits the data available in two disjoint sets: a training set and a testing/validation set. The training set is used to build the model, while the accuracy of the model is evaluated on the testing set. To reduce variability, multiple rounds of cross-validation may be performed using different partitions of the data set.

In one aspect, a known leave-one-out cross-validation may be employed. Leave-one-out cross-validation involves using a single element from the original data set as the testing data, and the remaining elements as the training data. Cross-validation is repeated for each element in the data set and the results are aggregated across all rounds.

In one aspect, data set may contain several runs for the same application (e.g., referred to also as benchmark). In such a case, a variant of leave-one-benchmark-out may be used to determine accuracy of a built model. For instance, instead of leaving one run out of the data set, all runs for a particular benchmark (i.e., leave-one-benchmark-out, labeled in the graphs as one-out) may be left out. This corresponds to having no prior information on one particular benchmark. To understand the robustness of the predictive model, cross-validation leaving two benchmarks out may be conducted. For example, the set of benchmarks may be randomized and performed cross validation may be performed leaving all runs from two benchmarks out. To eliminate variations due to pairing benchmarks, this type of experiment may be run multiple (e.g., ten) times and the accuracies over all trials may be aggregated.

In one embodiment of the present disclosure, the models may be tuned for the gamma parameter since the accuracy of the models tend to be sensitive to gamma, while large values for C provided similar accuracy. Briefly, gamma and C values are parameters used in SVM.

Feature Subsets

NNGE uses weights to reward features that contribute to good predictions. When tuning feature sets for predictive models, the mechanism of the present disclosure in one embodiment may consider features for inclusion in the order of their weights provided by NNGE. This method results in a linear search over the features, refining the model by adding one feature at a time. In one aspect, the feature subset that yields the highest accuracy may be employed. When multiple feature subsets yield the same accuracy, the subset with fewer features may be employed.

Computing systems become more heterogeneous as hardware accelerators diversify and pervade the computational landscape. For such systems, determining the best device for running a particular computation may be non-obvious. The mechanism of the present disclosure in another aspect also allows for applicability of hardware (e.g., GPU) performance prediction for scheduling in heterogeneous systems. For example, the mechanism of the present disclosure in one embodiment may provide for predicting the device that provides the best performance, e.g., in a system with a CPU multi-core and two different hardware accelerators (e.g., GPUs).

In one embodiment, the accuracy of a multi-class classifier, e.g., based on NNGE may be investigated to determine the best device for a given application with a given input. Such a classifier can be used in scheduling applications on a heterogeneous system. A three-class classifier is described as an example implementation in the present disclosure. The three classes correspond to different hardware processors, e.g., a general processor and two GPUs (CPU, Tesla and FirePro as specific examples). The class for each run in the data set corresponds to the device that obtains the highest performance for that particular run. The classifier learns to predict which device performs the best for a particular run. For application features, computation and memory operations are chosen for hardware accelerator (e.g., GPU) performance. In one aspect, few as only these two features may be employed in building the three-class predictor. Additional features may be employed.

The accuracy of the classifier may be computed using leave-one-run-out cross validation. For the benchmarks with multiple inputs, this means that the model has available data about the benchmark on a different input set. This assumption is practical for runtime scheduling systems, where same application can be observed multiple times, but not necessarily with the same input. For collecting application features, techniques such as low-cost dynamic instrumentation through sampling or hardware performance counters may be employed to extract application profiles.

As described, machine learning classifiers can be used to predict the magnitude of hardware accelerator (e.g., GPU) speedup from runs on a conventional multi-core. The models are derived automatically, learning from past porting experiences to the targeted device. The predictions rely on a small set of features extracted from dynamic instruction profiles collected on a general purpose multi-core.

Figure 3:
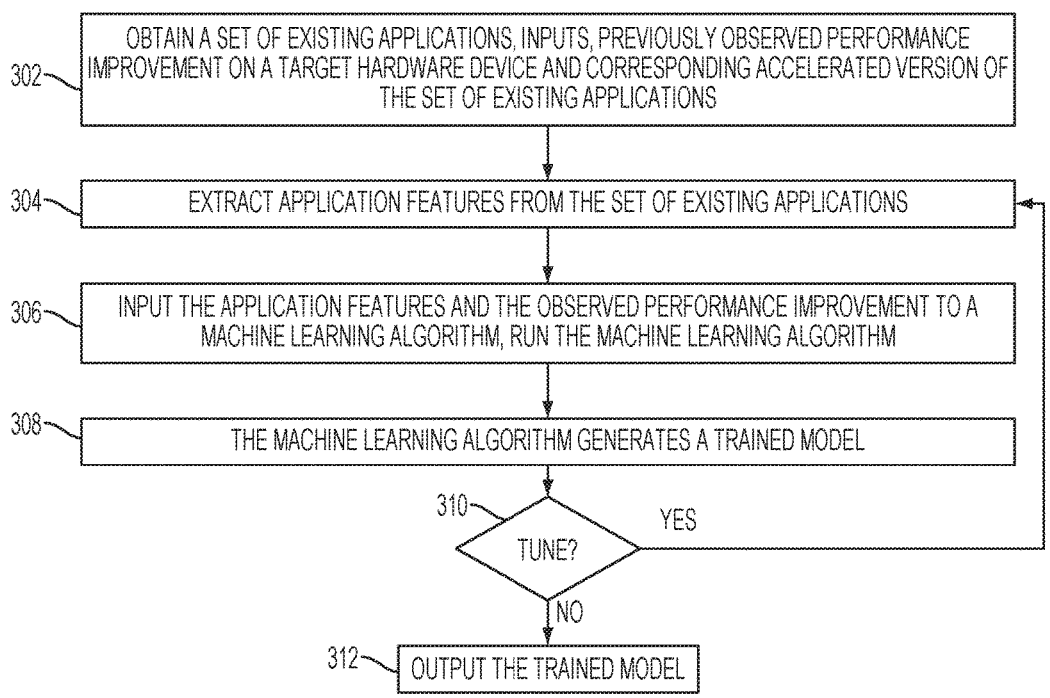
FIG. 3 is a flow diagram illustrating a methodology of the present disclosure in one embodiment for training a predictive model.

FIG. 3 is a flow diagram illustrating a methodology of the present disclosure in one embodiment for training a predictive model. At 302, a set of existing applications, inputs (if needed) and previously observed performance improvement (speedups or speedup measurement or metric) on a target hardware device (e.g., a specialized processor such as an accelerator) may be obtained or received. The set of existing applications may include program code, e.g., including program constructs such as parallel loops, branches, arithmetic and logic instructions, memory access, and others. Input may include data that an application uses in running its functions. In one aspect, if the applications do not take any input, no input needs to be obtained at 302.

The observed performance improvement on a target hardware device includes information about the speed up of the particular application when run on the target hardware device. Corresponding accelerated versions of the set of existing applications are those that have been ported over for running on the target hardware device, e.g., translated or modified to run on the target hardware device. The accelerated version is used to compute the speedup over the baseline run, in this case the CPU run. The computed speedup is used by a training technique to train a model.

At 304, application features are collected from the set of existing applications. As described above, the features may be collected dynamically by dynamic instrumentation of the running application, or statically. The set of existing applications may be run on one or more general purpose machines or processors to gather such features. Example features are listed in Table 1 above.

At 306, the application features and the observed performance improvement are input to a machine learning algorithm. As a person of ordinary skill in this technology would appreciate, training depends on the chosen machine learning algorithm. Each machine learning model has parameters that are approximated based on the training data. As discussed above, example machine learning algorithms may include, but are not limited to, nearest neighbor and support vector machines. The machine learning algorithm or technique may be executed on one or more computer processors. A computer processor that is used to run the machine learning algorithm may be the same or different processor (machine) from the one on which the applications were run at 304.

At 308, the machine learning algorithm generates a trained model. Particular form of the trained model depends on the machine learning algorithm that is used to train the model. A trained model, e.g., comprises a mathematical formula for which the parameters are determined during training. Such formula may characterize instruction feature set with the parameters.

At 310, the trained model is iteratively tuned, e.g., by repeating the processing at 304, 306 and 308, with different or additional application features, e.g., if tuning is desired, or for example, based on a threshold or criteria. At 312, the trained model is output. The methodology of the present disclosure provides for automatic construction of models for hardware devices, e.g., new devices on a heterogeneous computing system.

Figure 4:
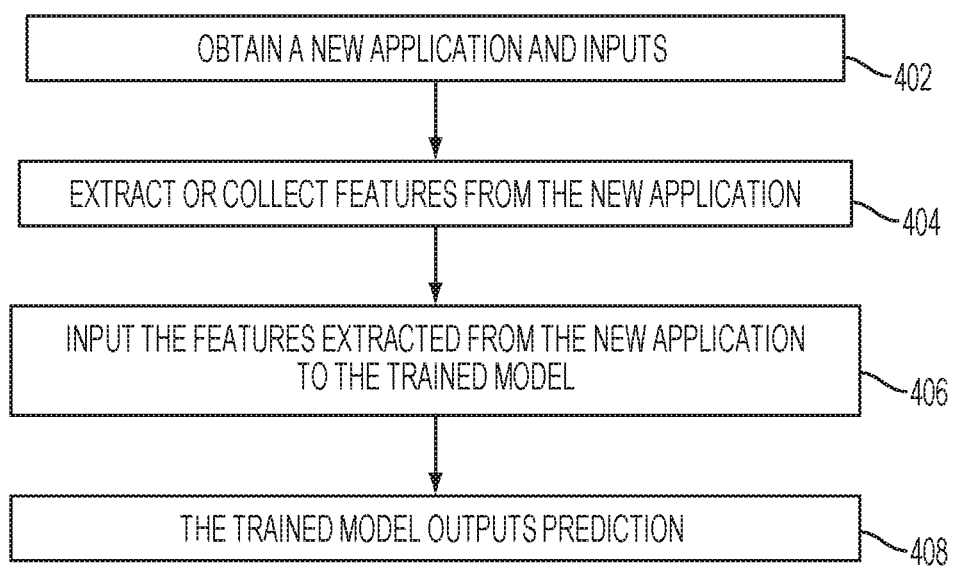
FIG. 4 is a flow diagram illustrating a methodology of the present disclosure in one embodiment for predicting performance of an application on a hardware device if it were to be ported to that hardware device.

FIG. 4 is a flow diagram illustrating a methodology of the present disclosure in one embodiment for predicting performance of an application on a hardware device if it were to be ported to that hardware device. The performance is predicted without having to actually port it to that hardware device. At 402, a new application and inputs (if the application is expecting inputs) are obtained or received. The new application is an original code that is programmed for running on a general purpose computer, e.g., a CPU, e.g., non-accelerated version. At 404, features from the new application are collected, for example, using the similar method used to collect application features described above.

For example, the new application is run on a general purpose computer and dynamic instrumentation may extract application features from the new application. Examples of features are listed in Table 1. At 406, the features extracted from the new application are input to the trained model, e.g., generated according to the methodology described above. For instance, the features that the trained model uses for prediction are input to the trained model. The trained model is executed on one or more computer processors (which may the same or different computer processor from that used at 404, 304 and 306). At 408, the trained model outputs the prediction. Prediction may be in a form of performance/speedup factor for the new application, without having to port it to the accelerator to determine the new application's performance, for example, whether the application when ported will experience a speedup (performance improvement) greater than T, a speedup threshold wherein T can be predefined and can vary. Thus, in one aspect, the methodology of the present disclosure predicts performance of an application written for a general processor on a specialized hardware device even before porting the application to a specialized hardware device.

Figure 5:
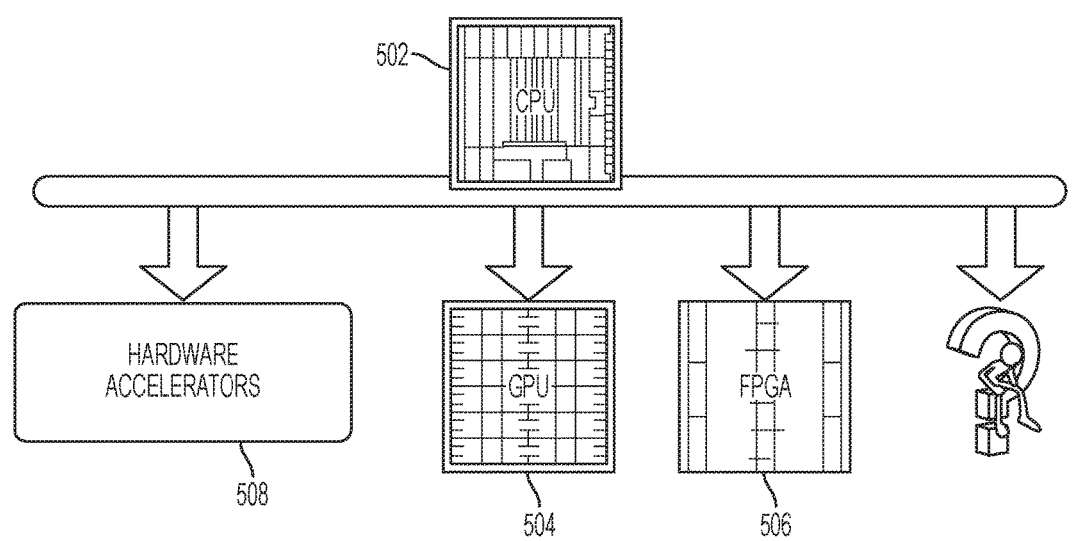
FIG. 5 is a block diagram illustrating a heterogeneous computing system in one embodiment of the present disclosure.

FIG. 5 is a block diagram illustrating an example heterogeneous computing system in one embodiment of the present disclosure. An example heterogeneous computing system may include a general processor 502, and one or more specialized computing devices, e.g., a GPU 504, an FPGA 506, and other hardware accelerators 508. Specialized computing devices may execute a reduced set of computations. A predictive model of the present disclosure in one embodiment, in prediction phase (e.g., shown in FIG. 1 at 104) may predict whether an application written for a general purpose program can benefit in performance if it were to be ported over and run on one or more of the specialized computing devices 504, 506, 508, or even another specialized computing device 510 that is not yet a component of the heterogeneous computing system. For example, if the predictive model of the present disclosure predicts that a certain device would accelerate the application (e.g., to a threshold amount), a user might decide to add that component to the heterogeneous computing system. Yet in another embodiment, one or more predictive models may predict the best specialized computing device (e.g., out of 504, 506, 508) for running the application code that is ported to accelerator code.

In another aspect, a set of observed application performance may be obtained associated with each of a plurality of target hardware devices. A plurality of predictive models may be built, each of the plurality of predictive models corresponding to a respective one of the plurality of target hardware devices, based on the application features and the observed application performance respectively associated with the respective one of the plurality of target hardware devices. The predictive models may be employed to determine a best target device from the plurality of target devices for running a new application. Thus, for example, there may be one predictive model per device and each model may be used to predict performance on each corresponding device for the new application. Based on the outputs of the predictive models, the best device may be chosen.

Figure 6:
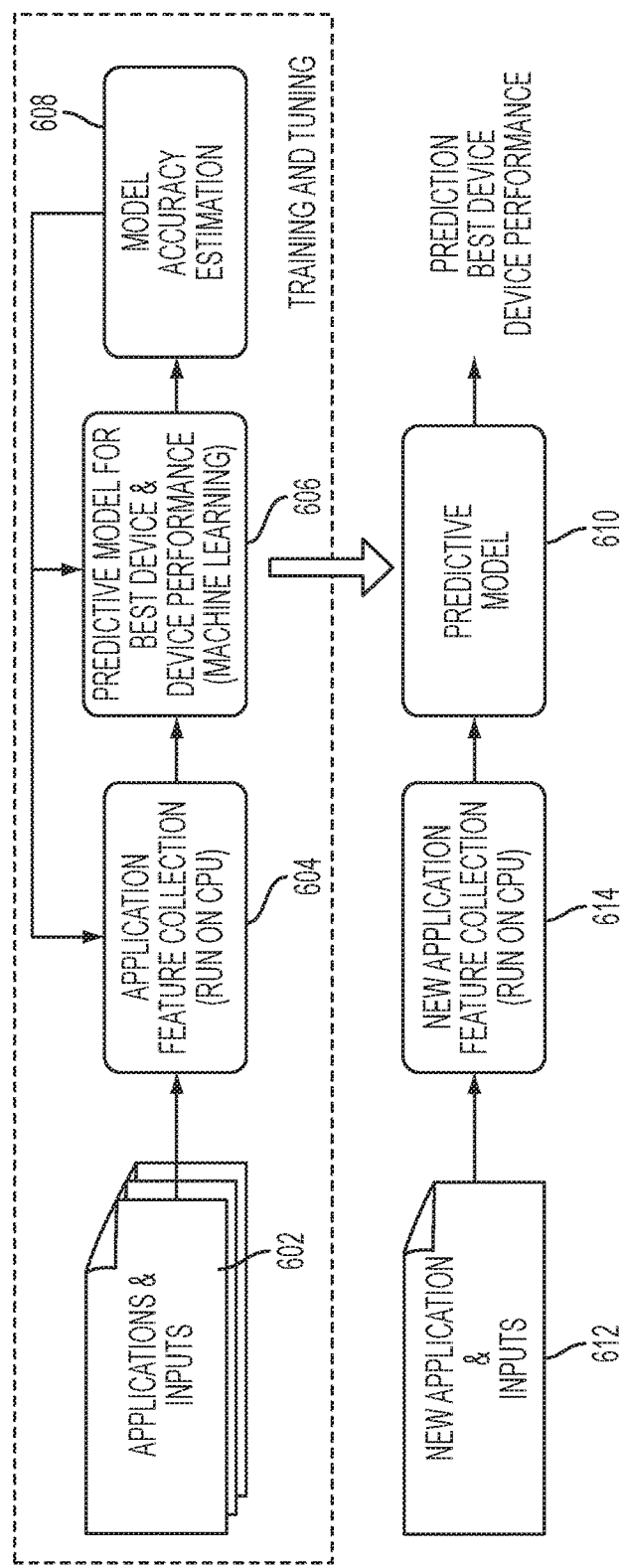
FIG. 6 is a block diagram illustrating the methodology of the present disclosure that may predict which application to run on which device in one embodiment of the present disclosure.

In another aspect, one model may be built that predicts the device with the best performance. For instance, given multiple applications, a methodology of the present disclosure may predict what application to run on which devices(s). FIG. 6 is a block diagram illustrating the methodology of the present disclosure that may predict which application to run on which device in one embodiment of the present disclosure. A heterogeneous computing system may comprise one or more general purpose processors and hardware accelerators. A collection of applications, e.g., written in a unifying language, and inputs to the application 602 may be obtained or received. Each of the obtained applications may have a label associated with the application, the label indicating a device that ran that particular application with best performance improvement. For instance, consider an example case where there are three class labels, e.g., class A, class B, class C, each representing a computing device. Application 1 may have label A, indicating that Application 1 performs best when run on specialized computing device A; Application 2 may have label B, indicating that Application 2 performs best when run on specialized computing device B; Application 3 may have label C, indicating that Application 3 performs best when run on specialized computing device C; Application 4 may have label B, indicating that Application 4 also performs best when run on specialized computing device B; and so forth. The applications are run on a general purpose processor (e.g., CPU) with their inputs (if any), and their features are collected at 604. Feature collection may utilize the same methodology described above. Examples of features are shown in Table 1.

At 606, machine learning techniques are employed to train or build predictive models for best devices and device performance. The features collected at 604 are input to a machine learning technique along with the labels associated with the applications from which those features have been extracted, to learn which features or combination of features of an application would benefit (e.g., improvement in performance) from running on which specialized computing device (e.g., hardware accelerator). Based on the extracted application features and labels, a predictive model may be trained. The trained predictive model may be a multiple classifier that can classify input data (application features) among multiple classes (e.g., multiple specialized computing devices).

The built predictive models may be tuned for more accurate estimation 608, e.g., by iterating the processing of 604 and 606, by varying the features considered when building the predictive model. Different features may prove useful depending on the specific device for which the model is built.

Once the predictive model is trained, at 610, the trained predictive model is employed to predict the best device to run an application. For instance, a new application and its input is obtained or received at 612. Unlike in the training stage (e.g., at 602), the new application is not labeled. The trained model labels this application, i.e., predicts best device to run this new application. The new application in one aspect may be written in the same language as the collection of applications (602). The new application is run on a general purpose processor to extract features at 614. Those features are input to the trained models 610, which predict which would be the best device to run the new application. For instance, the features extracted from the new application may be those that the predictive model uses in predicting. The predictive model may be run with the features extracted from the new application, and the predictive model outputs which specialized device would yield the best performance for the given application with the given input.

In one embodiment of the present disclosure, multiple such models may be trained, and a most accurate one selected for use for predicting (e.g., at 610). For example, known cross-validation technique described above may be used to select more accurate model from the multiple trained models.

In the present disclosure in one embodiment, performance of an application on a hardware computing device (e.g., hardware accelerator) may be predicted without having to run the application that hardware computing device. In one aspect, predictive models may be constructed automatically for new devices, e.g., a device that is not yet installed on a user's heterogeneous computing system, but the user might be considering to add to the system. Such models may also be used to guide scheduling applications and/or tasks in heterogeneous computing systems.

Figure 7:
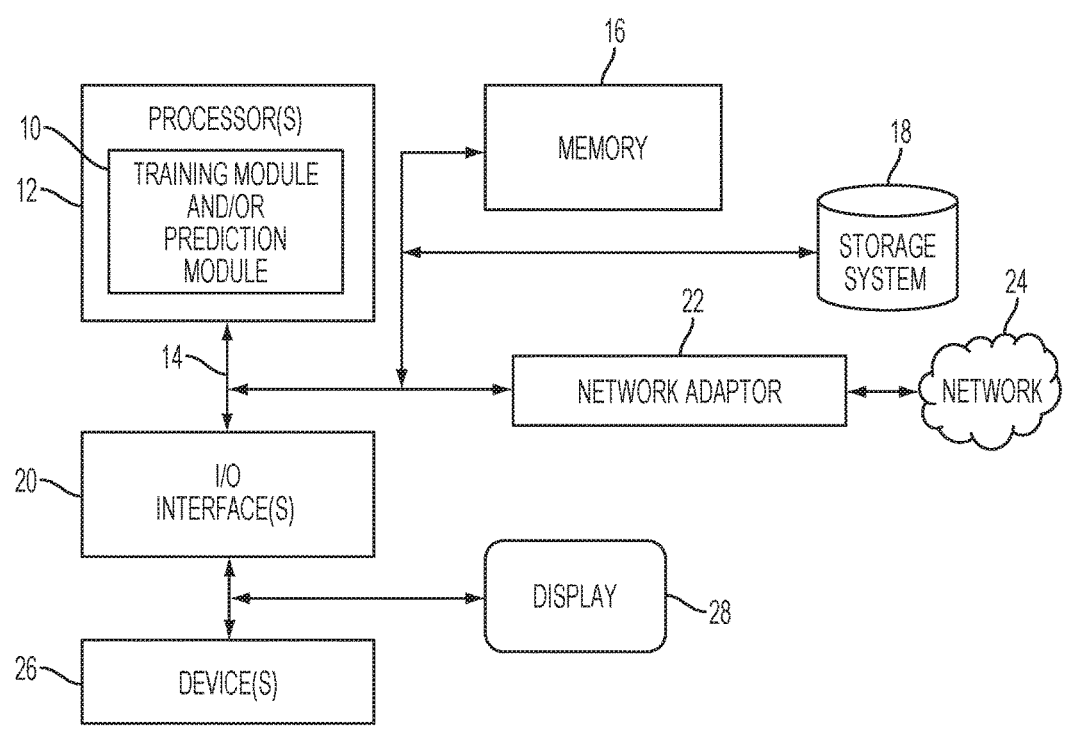
FIG. 7 illustrates a schematic of an example computer or processing system that may implement a prediction system in one embodiment of the present disclosure.

FIG. 7 illustrates a schematic of an example computer or processing system that may implement a predictive system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a training and/or prediction module 10 that performs the methods described herein. It should be understood that the training aspect and the prediction aspect of the module 10 may be separated and run on different processors, machines or systems. For instance, the prediction phase need not be performed on the same system together with the training phase. For example, once the module 10 performs training and produces one or more predictive models, the predictive models may be run on the same system or another system. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of predicting a hardware device for best program performance, comprising:
    obtaining a plurality of existing applications and observed performance on a plurality of target hardware devices, each of the plurality of existing applications labeled with one of the plurality of target hardware devices;
    running the plurality of existing applications on one or more general purpose computer processors and extracting application features from the existing application;
    inputting the application features, labels associated with the existing applications, and the observed performance on the plurality of target hardware devices to a machine learning technique;
    executing the machine learning technique; and
    training a predictive model by the machine learning technique for predicting a target hardware device out of the plurality of target hardware devices for running a given application.

2. The method of claim 1, wherein multiple of the predictive model are built based on different set of existing applications, and a more accurate predictive model is selected from the multiple of the predictive model based on a cross-validation algorithm performed on the multiple of the predictive model.

3. The method of claim 1, wherein the machine learning technique comprises multiple classifier technique.

4. The method of claim 1, further comprising:
    obtaining a new application;
    extracting new application features from the new application;
    running the predictive model based on the new application features on the one or more general purpose computer processors; and
    predicting by the predictive model a target hardware device out of the plurality of target hardware devices as a recommended device for running the new application.

5. The method of claim 4, wherein the application features and the new application features comprise one or more of parallel loops, branches, arithmetic and logic instructions, or memory access, or combinations thereof.

6. The method of claim 1, wherein the application features are extracted by dynamically instrumenting the applications running on the general purpose computer processor.

7. The method of claim 1, wherein the application features are extracted by statically analyzing the existing applications.

* * * * *